US012747177B2

(12) United States Patent
Tob

(10) Patent No.: US 12,747,177 B2
(45) Date of Patent: Sep. 29, 2026

(54) PROCESS FOR IN-LINE MINERALISATION AND CARBONATION OF DEMINERALISED WATER

(71) Applicant: FLAMINGO HOLDING SA, Uccle (BE)

(72) Inventor: Philippe Tob, Uccle (BE)

(73) Assignee: FLAMINGO HOLDING SA, Uccle (BE)

( * ) Notice: Subject to any disclaimer, the term of this patent is extended or adjusted under 35 U.S.C. 154(b) by 89 days.

(21) Appl. No.: 18/630,625

(22) Filed: Apr. 9, 2024

(65) Prior Publication Data

US 2024/0254027 A1 Aug. 1, 2024

Related U.S. Application Data

(62) Division of application No. 17/413,288, filed as application No. PCT/EP2019/085146 on Dec. 13, 2019, now Pat. No. 12,012,346.

(30) Foreign Application Priority Data

Dec. 14, 2018 (BE) .................................. 2018/5889
Apr. 11, 2019 (BE) .................................. 2019/5240

(51) Int. Cl.
*C02F 9/00* (2023.01)
*A23L 2/40* (2006.01)
(Continued)

(52) U.S. Cl.
CPC .................. *C02F 9/00* (2013.01); *A23L 2/40* (2013.01); *B01F 23/236* (2022.01); *C02F 1/68* (2013.01);
(Continued)

(58) Field of Classification Search
None
See application file for complete search history.

(56) References Cited

U.S. PATENT DOCUMENTS 4,034,139 A 7/1977 Mazarguil
6,158,721 A 12/2000 Katou
(Continued)

FOREIGN PATENT DOCUMENTS

CN 1101626 A 4/1995
JP H0929268 A 2/1997
(Continued)

OTHER PUBLICATIONS

European Patent Office; International Search Report and Written Opinion issued in PCT App No. PCT/EP2019/085146 dated Feb. 11, 2020; 9 pages.

*Primary Examiner* — Clare M Perrin
(74) *Attorney, Agent, or Firm* — Maschoff Brennan

(57) ABSTRACT

The invention proposes a process of in-line mineralisation of water according to which demineralised water is circulated in a pipe inside which enzymes are immobilised to catalyse the reaction of carbon dioxide and water to form bicarbonate, carbon dioxide is introduced into the pipe, and a pre-determined quantity of solid minerals, preferably magnesium and/or calcium carbonate, is introduced into the circulating water. The process enables to accelerate the dissolution of carbon dioxide in the water, which optimises the dissolution of minerals for in-line mineralisation of water, i.e. without stopping the circulation of water. The invention also proposes a system for implementing the process.

17 Claims, 3 Drawing Sheets

(51) Int. Cl.

| | |
|---|---|
| ***B01F 23/236*** | (2022.01) |
| ***C02F 1/68*** | (2023.01) |
| *A47J 31/00* | (2006.01) |
| *C02F 1/00* | (2023.01) |
| *C02F 1/66* | (2023.01) |
| *C02F 3/34* | (2023.01) |
| *C02F 101/30* | (2006.01) |

(52) U.S. Cl.
CPC ............... *A47J 31/00* (2013.01); *C02F 1/001* (2013.01); *C02F 1/66* (2013.01); *C02F 3/342* (2013.01); *C02F 2101/30* (2013.01)

(56) References Cited

U.S. PATENT DOCUMENTS

| | | | | |
|---|---|---|---|---|
| 8,263,153 | B2 * | 9/2012 | Forchhammer | A23L 2/72 426/11 |
| 2012/0107899 | A1 * | 5/2012 | Borchert | B01D 53/84 435/252.35 |
| 2016/0304820 | A1 * | 10/2016 | Osborn | B01F 25/53 |
| 2018/0362379 | A1 * | 12/2018 | Collenot | C02F 9/00 |

FOREIGN PATENT DOCUMENTS

| | | | |
|---|---|---|---|
| JP | H0938476 | A | 2/1997 |
| KR | 20140023600 | A | 2/2014 |

* cited by examiner

PROCESS FOR IN-LINE MINERALISATION AND CARBONATION OF DEMINERALISED WATER

CROSS-REFERENCE

This patent application is a divisional of U.S. application Ser. No. 17/413,288 filed Jun. 11, 2021, which is a National Stage Entry of International Patent Application No. PCT/EP2019/085146 filed Dec. 13, 2019, which claims priority to Belgium Application No. 2018/5889 filed Dec. 14, 2018 and to Belgium Application No. 2019/5240 filed Apr. 11, 2019, which applications are incorporated herein by specific reference in their entirety.

BACKGROUND

The invention relates to the field of (re-) mineralisation of water.

Certain water sanitation or purification techniques include a demineralisation step. This is particularly the case, for example, on an industrial scale, of desalination of seawater, or on a domestic scale, of demineralisation of municipal water.

Water that has been, at least partially, purified of its minerals is generally slightly acidic, which makes it corrosive and, in the long-term, it can deteriorate the pipes through which it flows. It also has a very dull taste, which makes it unpleasant to consume.

It is therefore common to re-mineralise desalinated or demineralised water, particularly with calcium and magnesium carbonates, in order to increase the pH and/or change its taste. However, the low rate of dissolution of these minerals in water is a limiting factor and it is necessary to stir fine mineral powders in a volume of water for several hours to reach a determined concentration of magnesium and/or calcium carbonates, a concentration which nevertheless remains limited. This method is neither effective industrially nor is it applicable to domestic appliances, the sizes of which must remain limited. Moreover, the concentrations of magnesium and/or calcium carbonates obtained by this method remain much lower than that of mineral water.

It has been shown in *Desalination* 396, (2016) 39-47, that it is possible to improve the dissolution rate of calcium and magnesium carbonates by acidifying the water beforehand using carbon dioxide ($CO_2$) or sulphuric acid, the latter dissolving 8 to 9 times more minerals than carbon dioxide. This difference is mainly because a lower pH can be achieved with sulphuric acid, which is a strong acid, than with carbon dioxide, which forms a weak acid when dissolved in water. This is also due to the low dissolution rate of carbon dioxide in water.

However, it is not desirable, neither industrially nor in domestic installations, to use sulphuric acid owing to the well-known risks associated with its handling (burns, corrosion, etc.).

The applicant thus felt the need to develop a process as well as a system allowing instant in-line mineralisation, in a controlled manner, of the water that has been previously demineralised, at least partially.

SOLUTION OF THE INVENTION

To this end, this invention proposes an instant process of in-line mineralisation of water according to which:

demineralised water is circulated in a pipe inside which enzymes are immobilised to catalyse the reaction of carbon dioxide and water to form bicarbonate carbon dioxide is introduced into the pipe, and a pre-determined quantity of solid minerals, preferably magnesium and/or calcium carbonate, is introduced into the circulating water.

The "instant" and "in-line" attributes mean that the water circulates continuously through the pipe and is never stored in a tank for treatment or dissolution of minerals.

Demineralised water refers to water with a low mineral content or with no minerals, particularly magnesium and calcium. The low mineral content can be obtained naturally, for example for spring water, or artificially, by desalination processes such as reverse osmosis, using resins, evaporation and re-condensation. A low mineral content preferably corresponds to a dry mineral residue of less than 500 mg/L and preferably even less than 100 mg/L.

The pipe in question generally refers to a conduit with a water inlet and a water outlet between which the water can circulate, i.e. have a calculable flow rate.

Carbon dioxide can be introduced into the pipe by bubbling gaseous carbon dioxide in it using a conventional bubbler or through a membrane.

Alternatively, the pipe is permeable to carbon dioxide and impermeable to water over at least a part of its length and carbon dioxide is introduced into the pipe by applying carbon dioxide pressure to the outer wall of the pipe.

The pipe may, for example, be a tube whose wall is a membrane that is permeable to carbon dioxide. It may also be multiple parallel bundles, such as, for example, hollow fibres, the walls of which are membranes that are permeable to carbon dioxide. This configuration has the advantage of increasing the contact surface between the water and the walls, i.e. with the pores allowing the adsorption of carbon dioxide in the water circulating through the pipe, without any water leaking out of the fibre, and with the immobilised enzymes inside the pipe.

The enzymes catalysing the reaction of carbon dioxide and water to form carbonic acid and then bicarbonate are preferably carbonic anhydrase. This enzyme, of EC 4.2.1.1 class, is well known for its ability improve the rate of dissolution of $CO_2$ in water but has never been used in-line, in combination with the means of injecting mineral powder, or other means of dissolving minerals, in order to optimise its dissolution.

The means for immobilising the enzymes inside the pipe are the conventional means of immobilising enzymes on mineral or polymeric surfaces, which are well known to the persons skilled in the art. It can, for example, be an immobilisation by grafting enzymes on the inner side of the wall/membrane or on the balls or particles held inside the pipe by filters or grids whose mesh allows water to pass but not the balls/particles.

Here, the term "circulating water" refers to the fact that there is no tank in which water would be immobilised when being stirred with mineral powder. The process of the invention is instant, and in-line, and therefore allows industrial implementation, for example, downstream of a desalination unit, which is particularly advantageous, for example, for supplying municipal water. It also allows domestic implementation as it allows saving space. The absence of mixing tank also limits the risk of bacterial growth in stagnant water.

Preferably, a pre-determined quantity of solid minerals, preferably magnesium and/or calcium carbonate, is introduced into the circulating water by injecting a mineral powder or by circulating the water through a mineral bed.

Here, solid minerals mean that the water to be re-mineralised comes into contact with the mineral in its solid form, and not pre-dissolved in a solution.

The pipe of the invention can therefore be connected to a powder injector or can comprise a mineral column.

In case of injection, the injected powder is a very fine or fluidified powder, composed of particles having diameters of about a few microns, for example 5 to 1000 microns, which have great fluidity and whose volume can be measured in a manner very similar to liquid solutions. These powders have the advantage that they can be packaged in compact cartridges. The dosing of small quantities of powder, i.e. a few microlitres is possible using, for example, technologies developed for 3D or laser printing, where layers of powders are deposited. A person skilled in the art can however use any other suitable technology for dosing fine powders.

These techniques enable injecting a pre-determined quantity of powder, i.e. a quantity defined in advance with the aim of obtaining an equally pre-determined quantity of dissolved minerals.

If a mineral column is used, it comprises a bed of granules or mineral balls, the particle size of which may, for example, be between 0.5 and 4.5 mm.

Advantageously, mineral balls are combined/mixed with the balls onto which the enzymes, catalysing the reaction of carbon dioxide and water to form carbonic acid and then bicarbonate, are grafted.

Alternatively, carbon dioxide is introduced into the demineralised water and dissolved by circulating the demineralised water over the enzymes before introducing solid minerals. Thus, the minerals are not in contact with the enzymes and carbon dioxide. The applicant has surprisingly found that the balance for converting carbon dioxide into carbonic acid and then into carbonate is maintained for a few moments, i.e. a few seconds, which is enough time for the water that is thus acidified to reach the mineral dissolution zone downstream. This prevents the need to put the enzyme in contact with the minerals, which preserves it and also prevents the presence of traces of enzymes in the mineralised water. Though the enzyme is not toxic, the water obtained is thus in compliance with the regulations. This advantage cannot be obtained with processes where the mixing takes place in reaction vessels instead of being "in-line".

This invention also proposes a system for implementing the process of the invention. It is a system for re-mineralising water that is at least partially demineralised, comprising a water circulation pipe from an inlet to an outlet along which the following are placed:

- means for introducing carbon dioxide into the pipe;
- enzymes that are capable of catalysing the reaction of carbon dioxide and water to form bicarbonate, and immobilised inside the said pipe, and
- means for introducing a pre-determined quantity of magnesium and/or calcium carbonate in solid form.

Preferably, the means for introducing carbon dioxide into the pipe comprise a wall permeable to carbon dioxide over at least a part of the length of the pipe and means for applying carbon dioxide pressure on the outer side of the said wall that is permeable to carbon dioxide.

The means for applying carbon dioxide pressure on the outer side of the wall that is permeable to carbon dioxide may comprise an air-tight chamber connected to an inlet of pressurised carbon dioxide and has at least the part of the pipe, comprising the wall that is permeable to carbon dioxide, passing through it.

Advantageously, a static mixer, for example, a helical insert, creating turbulence in the water which circulates therein is placed at the outlet of the pipe in order to optimise the mixture between the water, the dissolved carbon dioxide, and the added minerals.

The means for introducing a pre-determined quantity of magnesium and/or calcium carbonate in solid form are preferably placed downstream of the enzymes capable of catalysing the reaction of carbon dioxide and water to form bicarbonate.

The means for introducing a pre-determined quantity of magnesium and/or calcium carbonate are, for example, a mineral column and/or powder injector.

The powder injector can, for example, be a micro-dosing device that dispenses micro-volumes of powders according to the flow rate of the water passing through the pipe. The frequency at which the concentrated solution or the powder is dispensed as well as the dispensed volume is pre-determined according to the circulation flow rate of the water to be re-mineralised in order to optimise the efficacy of the helical insert and to obtain, at the outlet of the system, water with a distinctly constant concentration over time.

The mineral column may, for example, be a column of the Akdolit® CM type, comprising a bed of dolomite particles (rock comprising at least 50% dolomite).

Advantageously, the system for implementing the process of the invention is a cartridge comprising the inlet of the water to be re-mineralised and the outlet of re-mineralised water and the means for introducing carbon dioxide into the cartridge, said cartridge containing a mixture of mineral balls and the balls onto which the enzymes, catalysing the reaction of carbon dioxide and water to form carbonic acid and then bicarbonate, are grafted. Preferably, the means for introducing carbon dioxide into the cartridge are placed such that it enables the circulation of carbon dioxide through the bed of mixed balls and the inlet and outlet of water are placed such that it enables the circulation of water through the bed of mixed balls.

The mineral balls preferably comprise magnesium and/or calcium carbonate but can also comprise magnesium hydroxide and/or calcium hydroxide and/or dolomite and/or magnesite (MgO).

The term ball does not imply a spherical shape; a ball can have an irregular shape.

The mineral balls and the balls onto which the enzymes are grafted preferably have the same size, but may also have different dimensions. For example, the mineral balls have a grain size between 0.5 and 4.5 mm, as in the Akdolit® Hydro-Calcit products, which mainly comprises calcium carbonate, or Akdolit® CM (Magno Dol), sold by Rheinkalk Akdolit GmbH & Co. KG.

The balls onto which the enzymes are grafted can, for example, have a particle size between 10 microns and 3.5 mm.

If the dissolution of $CO_2$ in water using an enzyme such as carbonic anhydrase is known, it is the combination of this step with the introduction of minerals, particularly magnesium and/or calcium carbonate, preferably in solid form, which is the heart of the invention, for instant and in-line re-mineralisation of water with low mineral content at a pre-determined mineral concentration. It is the dissolution of mainly the calcium and magnesium as well as carbonates that is crucial for the hardness and taste of the water. Many processes have been described for dissolving magnesium and calcium hydroxides or chlorides. However, these salts do not allow introducing carbonates, the content of which is significantly high, and it is therefore necessary to introduce them through other salts that make the total mineral balancing complicated. The process of the invention therefore makes it possible to obtain water that is rich in both, calcium and/or magnesium as well as bicarbonates.

The process of the invention makes it possible to precisely control the supply of $CO_2$ in water, its rate of conversion by the enzyme and thus the quantity of dissolved minerals.

The process of the invention also enables obtaining clear water at the outlet of the system allowing its implementation. Whether on a domestic or an industrial scale, obtaining clear water is essential so that the pipes and/or conduits through which the re-mineralised water will flow do not clog up due to the accumulation of solid particles, which could lead to variations in the flow rates of water, reduced system efficiency and high maintenance costs. Clear water is also desired by the end user.

It may also be advantageous to place a selective filter selectively retaining the organic substances along the pipe, downstream of the enzymes, in order to eliminate all traces of enzymes or enzyme residues in the produced water, without however eliminating the minerals or carbonic acid or bicarbonate. Such a selective filter can, for example, be an activated carbon filter or any other filter having similar functions.

The invention is better understood using the following description of several embodiments of the invention, with reference to the attached drawing, in which.

Figure 1:
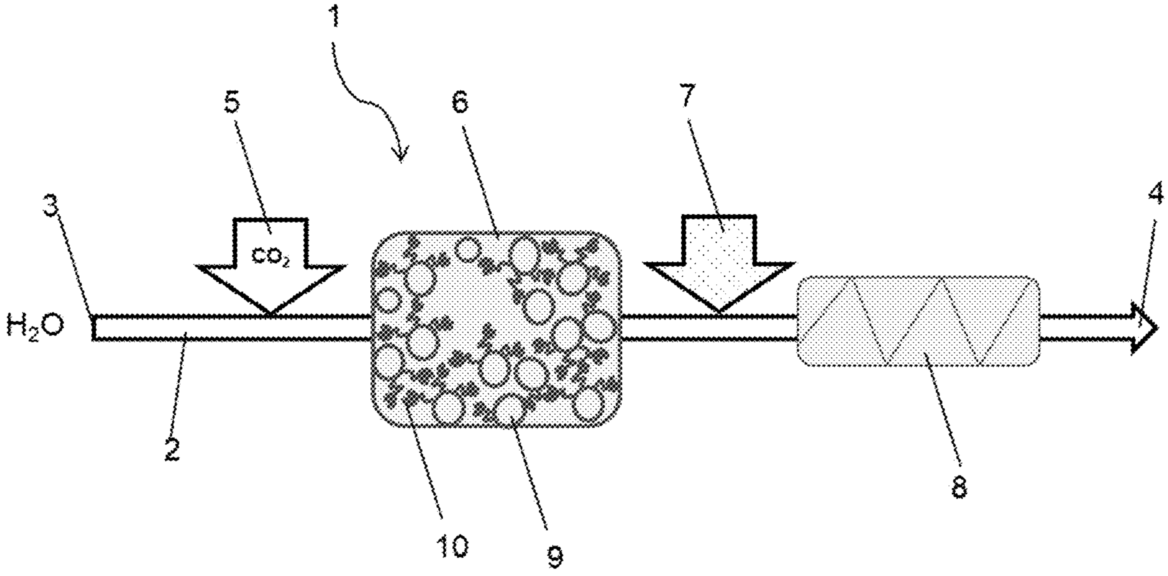
FIG. 1 illustrates the first embodiment of the invention.

With reference to FIG. 1, a system 1 for re-mineralising water that is at least partially demineralised, comprises a pipe 2, for circulating water from an inlet 3 to an outlet 4 between which an inlet 5 of carbon dioxide, a compartment or cartridge 6 containing balls 9 onto which enzymes 10 capable of catalysing the reaction of carbon dioxide, for example carbonic anhydrase, are grafted, a powder injector 7 and a static mixer 8 are placed.

The inlet 5 of carbon dioxide ($CO_2$) can be any means of introducing $CO_2$ into a water flow well known to the persons skilled in the art such as, for example, a tube connected to a source of pressurised carbon dioxide, for example a $CO_2$ generator or cylinder, and comprising a valve for regulating the flow rate of $CO_2$. The type of installation for the $CO_2$ inlet depends mainly on the size of the system, particularly the flow rates and volumes of water to be managed.

The compartment 6 containing balls 9 onto which enzymes 10 capable of catalysing the reaction of carbon dioxide are grafted, for example carbonic anhydrase, is typically similar in its structure to any column of ion-exchange resins commonly used in water treatment. The balls can be made of polyamide resin, cellulose derivative, polysaccharide derivatives or any other polymer suitable for enzyme grafting, a technique that is well known to the persons skilled in the art.

The powder injector 7 is a means of injecting a predetermined quantity of powder. It can, for example, be a micro-dosing device, such as a micro-dosing valve or pump or a micro-dosing device of micronised powder. Such a device can, for example, comprise an ultrasonic system comprising an dosing nozzle, the diameter of which is 100 to 400 microns, or a system similar to those used in 3D printing, such as for example those described by X Lu, S Yang and JRG Evans (*Microfeeding with different ultrasonic nozzle designs*;—Ultrasonics, 2009*; Dry powder microfeeding system for solid freeform fabrication: Solid Freeform Fabrication* Symposium, Austin, T X, 2006*; Metering and dispensing of powder: the quest for new solid freeforming techniques*, Powder Technology, 178 (1), 56-72. DOI: 10.1016/j.powtec.2007.04.004).

The powder injected by the injector 7 is preferably calcium carbonate and/or magnesium carbonate.

For example, synthesis powder or micronised aragonite can be used. Aragonite is the stable polymorphic form of calcium carbonate at high temperature and under high pressure, while the other two polymorphs that are stable under ambient conditions are calcite and vaterite. The marine oolitic aragonite is particularly native to the Bahamas and Florida. Synthesis powders refer to very specific mineral salts, such as calcium carbonate for example, obtained by precipitation under special conditions that give specific properties and dimensions to the particles. For example, the article by Brečević, L. and Kralj, D. (2007*; on calcium carbonates: from fundamental research to application. Croatica Chemica Acta,* 80(3-4), 467-484) reviews the techniques to obtain polymorphic forms of calcium carbonate. This article describes in particular the formation of amorphous calcium carbonate, which is less stable than the crystalline forms (calcite, vaterite) or hydrated forms, but having a higher dissolution rate that can advantageously be used for implementing the process of the invention. Aragonite can also be obtained by synthesis. Synthesis powders of calcium carbonate and/or magnesium carbonate can, for example, be used, preferably at least partially in amorphous form. Depending on the nature or the quantity of minerals to be dissolved in water, several successive powder injectors can be placed along pipe 2.

The static mixer 8 is for example a helical mixer. It increases the turbidity in the water flow and improves the dissolution of the injected powder.

In practice, water with low mineral content, for example spring water, demineralised water or desalinated water enters pipe 2 at inlet 3. $CO_2$ is injected in gaseous form at $CO_2$ inlet 5. The water is charged with $CO_2$ that dissolves in small proportion before entering compartment 6.

In this compartment 6, upon contact with and under the action of enzymes, the dissolved part of $CO_2$ reacts with water to form carbonic acid and/or bicarbonate according to the equation $H_2O+CO_2 \leftrightarrow H_2CO_3 \leftrightarrow HCO_3^-+H^+$. Bicarbonate is soluble in water in its ionic form and its formation leads to a reduction in the pH value of the water.

Preferably, the pH attained by the action of carbonic anhydrase is between 4.5 and 5.5, and more preferably between 4.9 and 5.4.

The action of the enzyme allows to shift the balance of dissolution of $CO_2$ in water and to attain a concentration of bicarbonate that is not possible to obtain by other in-line techniques, i.e. without stopping the flow of water in compartment 6. The applicant also observed that, contrary to what might have been expected, this balance induced by the enzymes is maintained for several seconds in the water flowing from compartment 6, which gives ample time for the water that is thus acidified to reach the part of the pipe where the re-mineralisation takes place. The “in-line” aspect is therefore particularly advantageous here.

An activated carbon filter, or any other selective filter of organic substance, can be inserted into the system, for example before or after the powder injector 7. This helps in removing any possible trace of enzyme or enzyme residue from the water, without changing the mineral and/or carbonic acid or bicarbonate composition. At the outlet of compartment 6, the water with low mineral content and high bicarbonate content is re-mineralised by injection, at a regular frequency determined by the flow rate of water and the desired mineral content, of a determined quantity of powder 7, typically calcium and/or magnesium carbonate. The powder dissolves in the water circulating at an optimised speed thanks to the pH value of the water, which has been reduced by the dissolution of the $CO_2$. Carbonic anhydrase is essential so that sufficient dissolution of $CO_2$ takes place in-line, i.e. without stopping the water in a tank until complete dissolution.

These two chemical species, magnesium and calcium, are in fact particularly difficult to dissolve in-line, i.e. without having to stir the powder for a long time with the water to be re-mineralised. Concentrations similar to those found in mineral water rich in calcium and magnesium are particularly impossible to attain without the action of the enzyme described above.

The system of the invention can therefore prove to be particularly advantageous for in-line production systems of mineral water with pre-determined mineral content as described in the PCT/EP2018/057868 application.

For example, to reproduce a mineral water of the Geroldsteiner® type, the composition of which is described in Table 1 of the aforementioned document, from a previously demineralised water, 1816 mg/L of bicarbonate, 348 mg/L of calcium and 108 mg/L of magnesium must be provided. In view of the results obtained in *Desalinisation* 396, (2016) 39-47, (table 1, run 6), it would at best be possible to obtain a final pH value of 5.9, but a maximum concentration of 20 mg/L of calcium (0.53 mm $Ca^{2+}$) and 8 mg/L of magnesium (0.36 mm $Mg^{2+}$) by passing a solution into which $CO_2$ has been introduced in gaseous form over dolomite for more than 12 minutes. It would therefore be almost impossible to reproduce the composition of the Gerolsteiner® water.

TABLE 1

| Mineral element | Gerolsteiner (mg/L) |
|---|---|
| $Ca^{2+}$ | 348 |
| $Mg^{2+}$ | 108 |
| $Na^+$ | 118 |
| $K^+$ | 10.8 |
| $HCO_3^-$ | 1816 |
| $SO_4^{2-}$ | 38.7 |
| $Cl^-$ | 39.7 |
| $NO_3^-$ | 5.1 |
| Total dissolved solids | 2488 |
| pH | 5.9 |

There are means other than the direct addition of $CO_2$ in gaseous form to introduce carbon dioxide into the pipe.

Figure 2:
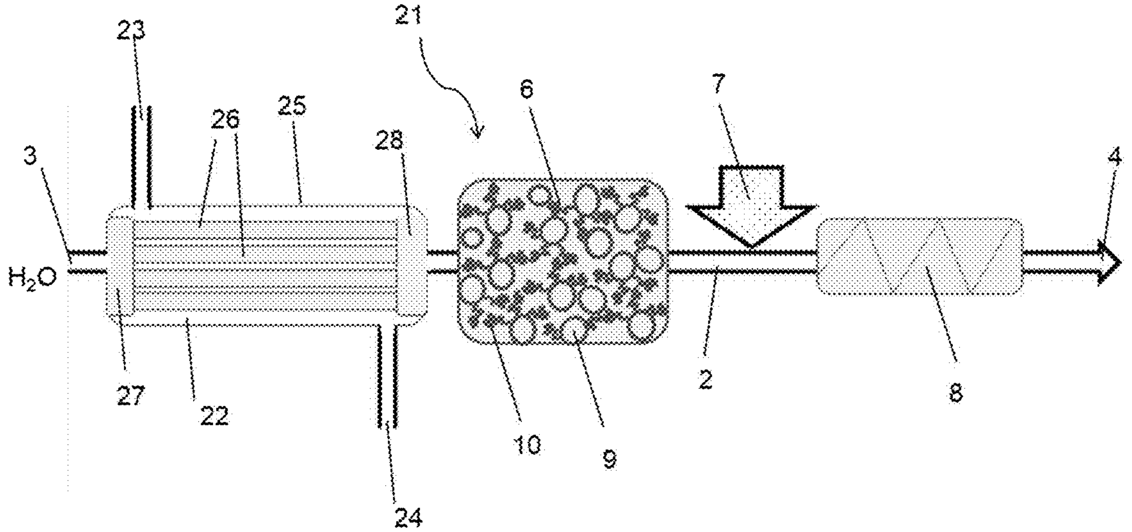
FIG. 2 illustrates the second embodiment of the invention.

With reference to FIG. 2, a system 21 for re-mineralising water that is at least partially demineralised, comprises, as described in FIG. 1, a pipe 2, for circulating water from an inlet 3 to an outlet 4 between which means 25 of introducing carbon dioxide, a cartridge 6 containing balls 9 onto which enzymes 10 capable of catalysing the reaction of carbon dioxide, for example carbonic anhydrase, are grafted, a powder injector 7 and a static mixer 8 are placed.

Here, the means 25 for introducing carbon dioxide comprise a chamber 22 equipped with an inlet 23 and an outlet 24 for $CO_2$. The pipe 2, after the inlet 3, continues into an anastomosis compartment 27 where the pipe is divided into several or a bundle of hollow fibres 26 (four are shown here) extending along the chamber 22 up to a second anastomosis compartment 28 where the hollow fibres 26 meet before the pipe leaves the chamber 25. Here, the hollow fibres 26 are tubes made using a membrane permeable to $CO_2$. The inlet 23 and outlet 24 for $CO_2$ are equipped with valves (not shown) that help in adjusting the pressure in the chamber 22. Such a module can, for example, be the MiniModule® of the 3M company comprising forty polypropylene/epoxy hollow fibres running through a cartridge on which the pressure of a gas can be applied.

As a general rule, the $CO_2$ pressure applied to the outer wall of the membrane permeable to $CO_2$ is preferably between 1 and 6 bar, at room temperature.

In practice, the water circulating in pipe 2 runs through the hollow fibres 26. The anastomosis compartments 27 and 28 help in managing the flow and the pressure of the water during the division of the pipe into bundles and the grouping of the bundles into a single flow. Carbon dioxide is introduced into the chamber 22 by the inlet 23 such that there is a pressure higher than the $CO_2$ pressure in the circulating water, in order to help the passage of $CO_2$ in the water circulating in the bundles. The valves placed at the inlet 23 and outlet 24 for $CO_2$ help in adjusting this pressure according to the amount of $CO_2$ that should be introduced into the water depending on the desired result, i.e. the amount of $CO_2$ that may react after coming into contact with the enzymes in the cartridge 6 and the pH value to be attained later for the proper dissolution of the powdered minerals. This type of chamber through which runs a bundle of membranes permeable to carbon dioxide is known and used to extract $CO_2$ from industrial fumes in order to limit the release of $CO_2$ into the atmosphere. In general, the $CO_2$ is adsorbed by an aqueous solution comprising various solvents that improve the dissolution of $CO_2$. However, these systems do not provide for the removal of a determined quantity of $CO_2$ as is the case here. Additionally, as part of the water treatment, in view of human consumption, it is not possible to use solvents to improve the removal of $CO_2$.

The division of the pipe into a bundle allows a larger contact surface between the circulating water and the $CO_2$ in the chamber, via the pores of the membrane permeable to $CO_2$. The optimum contact surface can be calculated according to the applications (industrial or domestic) and the volume of water to be treated.

The materials that can be used for membranes permeable to $CO_2$ are, for example, polypropylene, PTFE (Teflon), polyimide, polyolefins, etc. Such membranes are commercial, such as, for example, Superphobic® Contactors by Membrana GmbH or Celgard X40-200 or X30-240.

As with the bubbling of $CO_2$, this technique allows the water to be treated continuously, without immobilising the water in a tank.

The treatment line can be further optimised, particularly by removing the cartridge 6 and by immobilising the enzymes 10 directly inside the bundles of hollow fibres 26, using, for example, the standard techniques of immobilising enzymes on a polymeric material.

Figure 3:
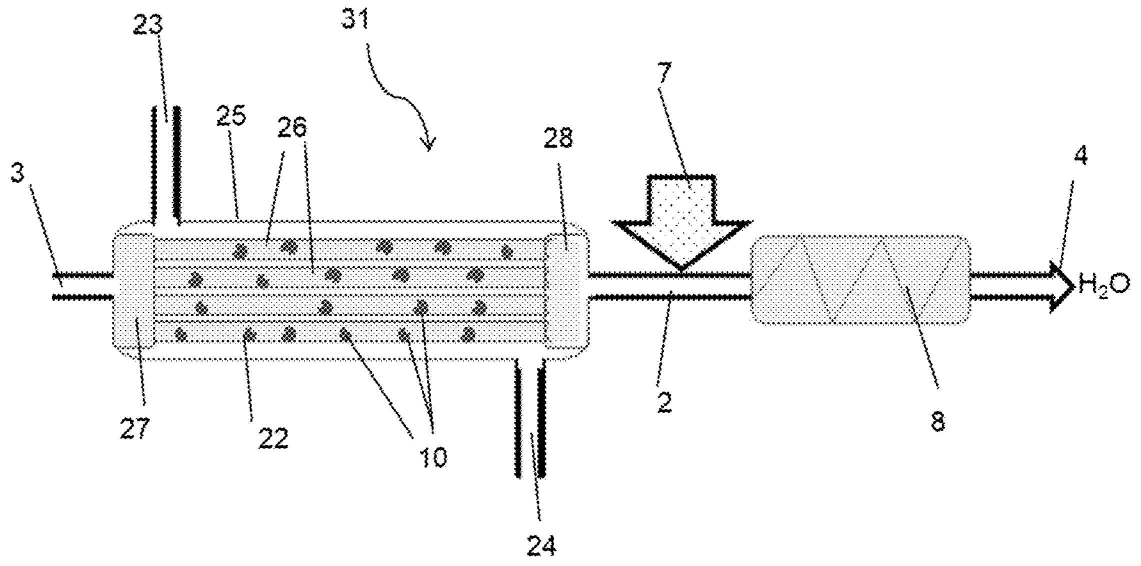
FIG. 3 illustrates the third embodiment of the invention.

With reference to FIG. 3, where the elements common to the previous figures are numbered in an identical manner, a system 31 for re-mineralising water that is at a least partially demineralised, comprises a pipe 2, for circulation of water from an inlet 3 to an outlet 4, between which is placed a chamber 22 similar to that described with reference to FIG. 2, through which runs a bundle of hollow fibres 26. Enzymes 10 that are capable of catalysing the reaction of carbon dioxide, for example carbonic anhydrase, are immobilised inside the hollow fibres, on the inner wall of the membrane.

Thus, the water passing through the pipe 2 is charged with $CO_2$ along the bundles of hollow fibres 26. As the $CO_2$ is being converted into bicarbonate under the action of enzymes 10 as the water flows through the hollow fibre 26, the absorption of $CO_2$ along the fibre can be optimised and higher quantities of bicarbonates can be produced. By removing the cartridge 6, it is thus possible to limit the length of the pipe and reduce the overall cost of the installation.

Here, the powder injector 7 and the mixer 8 are installed downstream of the unit 25. The static mixer has been described as being a helical mixer, but could be any other type of mixer known to the persons skilled in the art.

The powder injector is not the only way to introduce minerals, in solid form, into the water circulating in the pipe.

Figure 4:
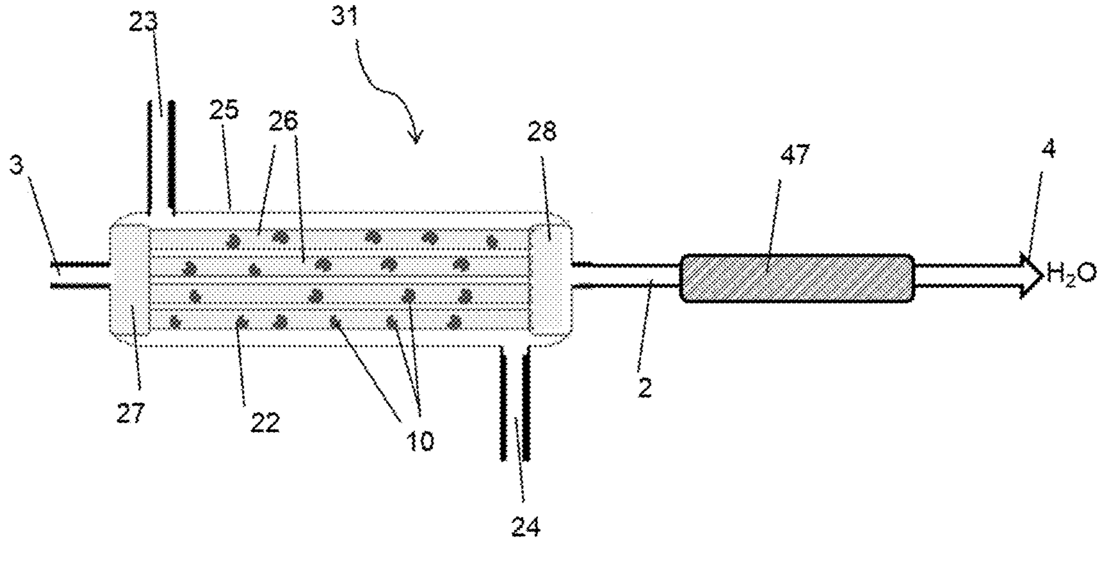
FIG. 4 illustrates the fourth embodiment of the invention.

The device of FIG. 4 shows a device similar to that of FIG. 3 where the powder injector 7 and the helical insert 8 are replaced by a mineral column 47, here for example an Akdolit® CM (Magno Dol) column, or any other column operating on the same principle. The column is part of pipe 2; it represents a portion of pipe 2. The same modification could also be made on the other systems described above.

The water circulating in pipe 2 passes through the bed of dolomite granules and after coming into contact with them becomes charged with magnesium, calcium and hydrogen carbonates. The dissolution of these species in the water is optimised thanks to the pH value of the water, which has been reduced by the dissolution of the $CO_2$. Carbonic anhydrase is essential to shift the acidification balance of water long enough so that sufficient dissolution of $CO_2$ takes place in-line, i.e. without stopping the water in a tank.

In all the described embodiments, it is possible to have more than one powder injector and/or more than one mineral column or a combination of the two, placed upstream and/or downstream of the means for introducing $CO_2$ in the pipe. For example, an injector could be placed upstream of the introduction of $CO_2$ to inject a part of the powders to be dissolved, a mineral column could, for example, be installed downstream to complement the mineral content. The dissolution could thus be carried out in several stages and distributed over a longer part of the system.

Depending on the nature of the minerals to be dissolved in the water, some could be injected separately, before or after the introduction of $CO_2$ or the injection of magnesium and/or calcium carbonate powders.

It is possible, for a domestic installation as described in PCT/EP2018/057868 to provide the unit 25 in the form of a consumable cartridge that must be changed after a few months, when the enzyme activity is reduced.

For an industrial installation, it is also possible to provide the unit 25 in the form of interchangeable, and possibly, recyclable columns.

Figure 5:
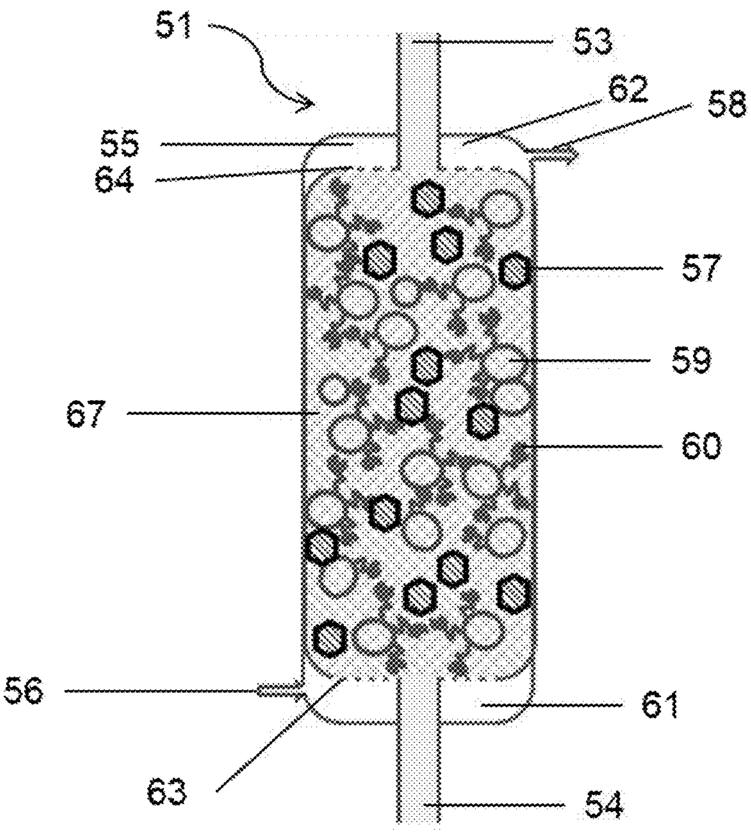
FIG. 5 illustrates a cartridge according to the invention.

FIG. 5 illustrates another embodiment of the invention, in the form of cartridge 51.

The cartridge 51 comprising an inlet 53 for water to be re-mineralised, here at the top of the cartridge, and an outlet 54 for re-mineralised water, here at the bottom of the cartridge. The introduction of carbon dioxide 55 into the cartridge takes place via an inlet 56 of carbon dioxide, here in the lower section of the cartridge, via a compartment 61. The compartment 61 has an interface 63 with a bed 67 of mixed balls 59 and 57. The balls 57 are mineral balls, while the balls 59 help enzymes 60 that catalyse the reaction of carbon dioxide and water to form carbonic acid and then bicarbonate. The bed 67 of mixed balls is here a cylinder that occupies most of the cartridge. At the top of the cartridge, the bed 67 of mixed balls has an interface 64 with a compartment 62 connected to a carbon dioxide outlet 58.

The water entering the cartridge 51 circulates through the bed 67 but does not enter the compartments 61 and 62. The carbon dioxide passes through the compartment 61, and then the bed 67 of mixed balls and lastly the compartment 62. The carbon dioxide inlet 61 and outlet 62 compartments are optional, but can help to regulate the flow rate and pressure of carbon dioxide passing through the bed 67.

Other systems can be proposed, for example, with a pressure gauge and/or a valve system.

The interfaces between the bed 67 of mixed balls and the carbon dioxide inlet 61 and outlet 62 compartments can, for example, be membranes allowing bubbling of the carbon dioxide through the bed, but not allowing the passage of water. It could also be a simple tube that may be equipped with a valve.

It should be noted that here carbon dioxide is introduced against the flow of water. This increases the residence time of carbon dioxide in the bed 67 of mixed balls.

The cartridge 51 can be provided at the water inlet 53 and the water outlet 54 with easy connection means to a domestic or industrial water system, possibly downstream of other units such as a softening or a demineralisation unit, so that it can be easily replaced. Any suitable means known to the persons skilled in the art can be considered here. The same applies to the inlet and outlet for carbon dioxide.

The invention is not limited to the production of mineral water, but can also be used to produce mineral concentrates, such as those used, for example, in the method and system of the WO2019020221 application or for pharmaceutical mineral concentrates.

The invention claimed is:

1. A process of in-line mineralisation of water, comprising the steps of:

circulating demineralised water through a chamber comprising hollow fibres onto which carbonic anhydrases are immobilised;

bubbling $CO_2$ through said chamber, said carbonic anhydrases catalysing the reaction of $CO_2$ and water to form bicarbonate; and downstream from said chamber, introducing a quantity of minerals in the circulating demineralised water through at least one mineral column, thereby complementing the mineral content of said demineralised water, wherein the process is a continuous in-line process wherein the demineralised water circulates continuously from the chamber to the at least one mineral column without being stored in an intermediate tank for treatment.

2. The process according to claim 1, wherein the quantity of minerals is introduced in the circulating demineralised water after the formation of bicarbonate.

3. The process according to claim 1, wherein said hollow fibres comprise tubes manufactured of a membrane permeable to $CO_2$.

4. The process according to claim 3, wherein the carbonic anhydrases are immobilised on the inner wall of the membrane permeable to $CO_2$.

5. The process according to claim 3, wherein for bubbling $CO_2$ through said chamber, a $CO_2$ pressure is applied to an outer wall of the membrane permeable to $CO_2$.

6. The process according to claim 5, wherein the $CO_2$ pressure is between 1.0 and 6.0 bar.

7. The process according to claim 1, wherein the carbonic anhydrases are immobilised on the inside the hollow fibres.

8. The process according to claim 1, wherein the minerals comprise magnesium and/or calcium carbonate.

9. The process according to claim 1, wherein the demineralised water is circulated through a filter that selectively retains organic substances and is placed downstream of said carbonic anhydrases.

10. A re-mineralisation system for demineralised water, comprising a pipe for circulating water from an inlet to an outlet along which the following are placed:

means for introducing carbon dioxide into the water, said means comprising a chamber with an inlet and an outlet for $CO_2$, a first anastomosis compartment, several or a bundle of hollow fibres extending along said chamber and a second anastomosis compartment, wherein carbonic anhydrases are immobilized onto said hollow fibres, said carbonic anhydrases catalysing the reaction of carbon dioxide and water to form bicarbonate; and downstream from said means, at least one mineral column to complement the mineral content of said water, wherein the pipe provides for a continuous in-line flow path directly connecting an outlet of the chamber to an inlet of the at least one mineral column without an intermediate storage tank therebetween.

11. The system according to claim 10, wherein said hollow fibres comprise tubes manufactured of a membrane permeable to $CO_2$.

12. The system according to claim 11, wherein the carbonic anhydrases are immobilised on the inside the hollow fibres.

13. The system according to claim 11, wherein the carbonic anhydrases are immobilised on the inner wall of the membrane permeable to $CO_2$.

14. The system according to claim 11, wherein a $CO_2$ pressure is applied to an outer wall of the membrane permeable to $CO_2$ for introducing carbon dioxide into the water.

15. The system according to claim 14, wherein the $CO_2$ pressure is between 1.0 and 6.0 bar.

16. The system according to claim 11, wherein the membranes permeable to $CO_2$ are manufactured of polypropylene, PTFE (Teflon), polyimide, polyolefins, or combinations thereof.

17. The system according to claim 10, wherein said inlet and outlet for CO2 are equipped with valves for adjusting the pressure in said chamber.

* * * * *